United States Patent
Bosman et al.

(10) Patent No.: US 11,138,894 B1
(45) Date of Patent: Oct. 5, 2021

(54) EDUCATIONAL LEARNING IMPORTATION

(71) Applicant: Workday, Inc., Pleasanton, CA (US)

(72) Inventors: Johan Bosman, Victoria (CA); Stuart Bowness, Victoria (CA); Willem Brosz, Victoria (CA); Alexander Nicholls, Victoria (CA); Michael Kennedy, Palos Verdes Peninsula, CA (US); Anthony Theocharis, Victoria (CA); Nathan Wright, Victoria (CA)

(73) Assignee: Workday, Inc., Pleasanton, CA (US)

( * ) Notice: Subject to any disclaimer, the term of this patent is extended or adjusted under 35 U.S.C. 154(b) by 242 days.

(21) Appl. No.: 15/272,329

(22) Filed: Sep. 21, 2016

(51) Int. Cl.
*G09B 5/00* (2006.01)
*G09B 5/06* (2006.01)
*G09B 5/12* (2006.01)
*G09B 7/00* (2006.01)
*H04L 29/08* (2006.01)

(52) U.S. Cl.
CPC .............. *G09B 5/065* (2013.01); *G09B 5/12* (2013.01); *G09B 7/00* (2013.01); *H04L 67/22* (2013.01)

(58) Field of Classification Search
CPC ... G09B 5/00; G09B 5/02; G09B 5/06; G09B 5/065; G09B 5/12; G09B 7/00; H04L 67/22
USPC ........................................................ 434/309
See application file for complete search history.

(56) References Cited

U.S. PATENT DOCUMENTS

| | | | |
|---|---|---|---|
| 6,343,319 B1 * | 1/2002 | Abensour | G09B 5/00 375/E7.024 |
| 6,385,602 B1 * | 5/2002 | Tso | G06F 17/30696 |
| 8,688,702 B1 | 4/2014 | Chapman | |
| 9,483,805 B1 * | 11/2016 | Fieldman | G09B 5/02 |
| 2004/0048234 A1 * | 3/2004 | Allen | G09B 5/00 434/350 |
| 2008/0281794 A1 | 11/2008 | Mathur | |
| 2011/0039249 A1 * | 2/2011 | Packard | G09B 5/00 434/362 |
| 2011/0177480 A1 * | 7/2011 | Menon | G09B 7/00 434/238 |
| 2011/0270873 A1 * | 11/2011 | Somanchi | G09B 5/00 707/769 |
| 2013/0073957 A1 * | 3/2013 | DiGiantomasso | G06Q 50/20 715/705 |
| 2014/0289273 A1 | 9/2014 | Embert | |
| 2014/0344252 A1 * | 11/2014 | Kapoor | G09B 7/02 707/722 |
| 2015/0026184 A1 * | 1/2015 | Ossikine | G06F 17/30705 707/738 |

(Continued)

*Primary Examiner* — Robert P Bullington

(74) *Attorney, Agent, or Firm* — Van Pelt, Yi & James LLP

(57) ABSTRACT

A system for educational learning importation includes an input interface and a processor. The input interface is configured to receive a selection of educational information. The selection of educational information is made from a combined set of search results based at least in part on searching a real time source and a static source. The processor is configured to determine whether the educational information is allowed to be imported; in the event that the educational information is allowed to be imported, determine whether it is selected to import the educational information; in the event that the educational information is selected to import the educational information, import the educational information; and provide the educational information.

21 Claims, 18 Drawing Sheets

(56) References Cited

U.S. PATENT DOCUMENTS

| | | | |
|---|---|---|---|
| 2015/0064684 A1* | 3/2015 | Watanabe | G09B 5/06 |
| | | | 434/367 |
| 2015/0120593 A1* | 4/2015 | Madhavan | G06Q 10/1053 |
| | | | 705/321 |
| 2015/0364050 A1* | 12/2015 | Baatz | G09B 5/12 |
| | | | 434/322 |
| 2016/0055604 A1* | 2/2016 | Herman | G06Q 50/2057 |
| | | | 434/219 |
| 2016/0103803 A1 | 4/2016 | Lam | |
| 2016/0232800 A1* | 8/2016 | Heenan | G09B 7/00 |
| 2016/0259858 A1* | 9/2016 | Vittorio | G06F 17/30867 |
| 2016/0275804 A1* | 9/2016 | Koppel | G09B 5/12 |
| 2017/0004720 A1* | 1/2017 | Ahuja | G09B 7/02 |
| 2017/0004721 A1* | 1/2017 | Aleahmad | G09B 7/02 |
| 2017/0193040 A1 | 7/2017 | Agrawal | |
| 2017/0213301 A1 | 7/2017 | Mason | |
| 2017/0249312 A1 | 8/2017 | Wang | |
| 2018/0005540 A1* | 1/2018 | Chetlur | G09B 7/00 |
| 2018/0068576 A1* | 3/2018 | Calmon | G09B 7/00 |

* cited by examiner

Educational Content Search Results — 300

Result 1
Title: Machine Learning: Making Sense of a Messy World
Source: YouTube
Views: 150,112
Likes: 3,532
Dislikes: 125
Organization Type Relevance: 4.2
Engagement Factor: 7.9

Result 2
Title: Deep Learning
Source: Udacity
Unpaid Content
Organization Type Relevance: 8.0
Engagement Factor: 6.6

Result 3
Title: Cluster Analysis And Unsupervised Machine Learning In Python
Source: Udemy
Paid Content
Organization Type Relevance: 8.8
Engagement Factor: 5.1

Result 4
Title: Practical Machine Learning
Source: Coursera
Free Content
Organization Type Relevance: 6.3
Engagement Factor: 5.8

| Factor | Importance | Score Lift (100 Point Scale) |
|---|---|---|
| Mobile Support | Low | +1 point |
| Language | High | +5 points |
| Source | Medium | Udemy +3 points<br>YouTube +2 points<br>Udacity +1 point |
| Utilization | High | > 100 internal views +3 points<br>> 1000 external views +2 points |
| Popularity/ Valence | Low | > 75% positive feedback +1 point |

| Source | Result Key | Attributes | Raw Relevance |
|---|---|---|---|
| Udacity | 1 | Mobile – Yes<br>Language – English<br>Utilization:<br>  - 0 internal views<br>  - 589 external views<br>Popularity/Valence:<br>  - no data | 0.76 |
| Udacity | 2 | Mobile – Yes<br>Language – English<br>Utilization:<br>  - 110 internal views<br>  - 12,251 external views<br>Popularity/Valence:<br>  - no data | 0.62 |
| Udacity | 3 | Mobile – No<br>Language – German<br>Utilization:<br>  - 35 internal views<br>  - 589 external views<br>Popularity/Valence:<br>  - no data | 0.52 |
| | | | |
| | | | |

| Source | Result Key | Attributes | Raw Relevance |
|---|---|---|---|
| YouTube | 4 | Mobile – Yes<br>Language – English<br>Utilization:<br>  - 0 internal views<br>  - 100k external views<br>Popularity/Valence:<br>  - 23 likes, 700 dislikes | 0.246 |
| YouTube | 5 | Mobile – Yes<br>Language – English<br>Utilization:<br>  - 1400 internal views<br>  - 32k external views<br>Popularity/Valence:<br>  - 4567 likes, 9 dislikes | 0.345 |
| YouTube | 6 | Mobile – Yes<br>Language – English<br>Utilization:<br>  - 0 internal views<br>  - 4234 external views<br>Popularity/Valence:<br>  - 321 likes, 0 dislikes | 0.689 |

•
•
•

|  |  |  |  |
|---|---|---|---|
|  |  |  |  |
|  |  |  |  |

| Source | Result Key | Attributes | Raw Relevance |
|---|---|---|---|
| Udemy | 7 | Mobile – No<br>Language – English<br>Utilization:<br>  - 432 internal views<br>  - 10,332 external views<br>Popularity/Valence:<br>  - 3 out of 5 stars | 1.24 |
| Udemy | 8 | Mobile – No<br>Language – English<br>Utilization:<br>  - 0 internal views<br>  - 4234 external views<br>Popularity/Valence:<br>  - 4 out of 5 stars | 2.35 |
| Udemy | 9 | Mobile – No<br>Language – English<br>Utilization:<br>  - 98 internal views<br>  - 345 external views<br>Popularity/Valence:<br>  - 5 out of 5 stars | 2.97 |

•
•
•

|   |   |   |   |
|---|---|---|---|
|   |   |   |   |
|   |   |   |   |

| Source | Result Key | Raw Relevance | Normalized Relevance |
|---|---|---|---|
| Udacity | 1 | 0.76 | 100 |
| Udacity | 2 | 0.62 | 72 |
| Udacity | 3 | 0.52 | 68 |
| YouTube | 4 | 0.246 | 36 |
| YouTube | 5 | 0.345 | 50 |
| YouTube | 6 | 0.689 | 100 |
| Udemy | 7 | 1.24 | 41 |
| Udemy | 8 | 2.35 | 79 |
| Udemy | 9 | 2.97 | 100 |

660

| Source | Result Key | Normalized Relevance | Lifted Relevance |
|---|---|---|---|
| Udacity | 1 | 100 | 107 |
| Udacity | 2 | 72 | 85 |
| Udacity | 3 | 68 | 74 |
| YouTube | 4 | 36 | 47 |
| YouTube | 5 | 50 | 64 |
| YouTube | 6 | 100 | 111 |
| Udemy | 7 | 41 | 54 |
| Udemy | 8 | 79 | 90 |
| Udemy | 9 | 100 | 109 |

670

| Source | Result Key | Lifted Relevance | Personalized Relevance |
|---|---|---|---|
| Udacity | 1 | 107 | 96 |
| Udacity | 2 | 85 | 77 |
| Udacity | 3 | 74 | 62 |
| YouTube | 4 | 47 | 42 |
| YouTube | 5 | 64 | 57 |
| YouTube | 6 | 111 | 100 |
| Udemy | 7 | 54 | 49 |
| Udemy | 8 | 90 | 81 |
| Udemy | 9 | 109 | 98 |

680

| Source | Result Key | Personalized Relevance |
|---|---|---|
| YouTube | 6 | 100 |
| Udemy | 9 | 98 |
| Udacity | 1 | 96 |
| Udemy | 8 | 81 |
| Udacity | 2 | 77 |
| Udacity | 3 | 62 |
| YouTube | 5 | 57 |
| Udemy | 7 | 49 |
| YouTube | 4 | 42 |

EDUCATIONAL LEARNING IMPORTATION

BACKGROUND OF THE INVENTION

Searching for educational material (e.g., online classes, videos, etc.) can be a complicated and frustrating process. There exist many different online content providers for educational material, including both free content providers and paid content providers. Some content providers comprise content creators that produce a set of educational material. Some content providers comprise content aggregators that receive and host content provided by users or third parties. Unlike traditional web pages which are designed to be indexed, different sources of content may require different interactions, creating problems when integrating search results received from a set of content providers.

BRIEF DESCRIPTION OF THE DRAWINGS

Various embodiments of the invention are disclosed in the following detailed description and the accompanying drawings.

FIG. 3 is a diagram illustrating an embodiment of search results.

FIG. 6B is table illustrating an embodiment of customer preferences.

FIGS. 6C, 6D, and 6E are tables illustrating embodiments of raw search results.

DETAILED DESCRIPTION

Figure 1:
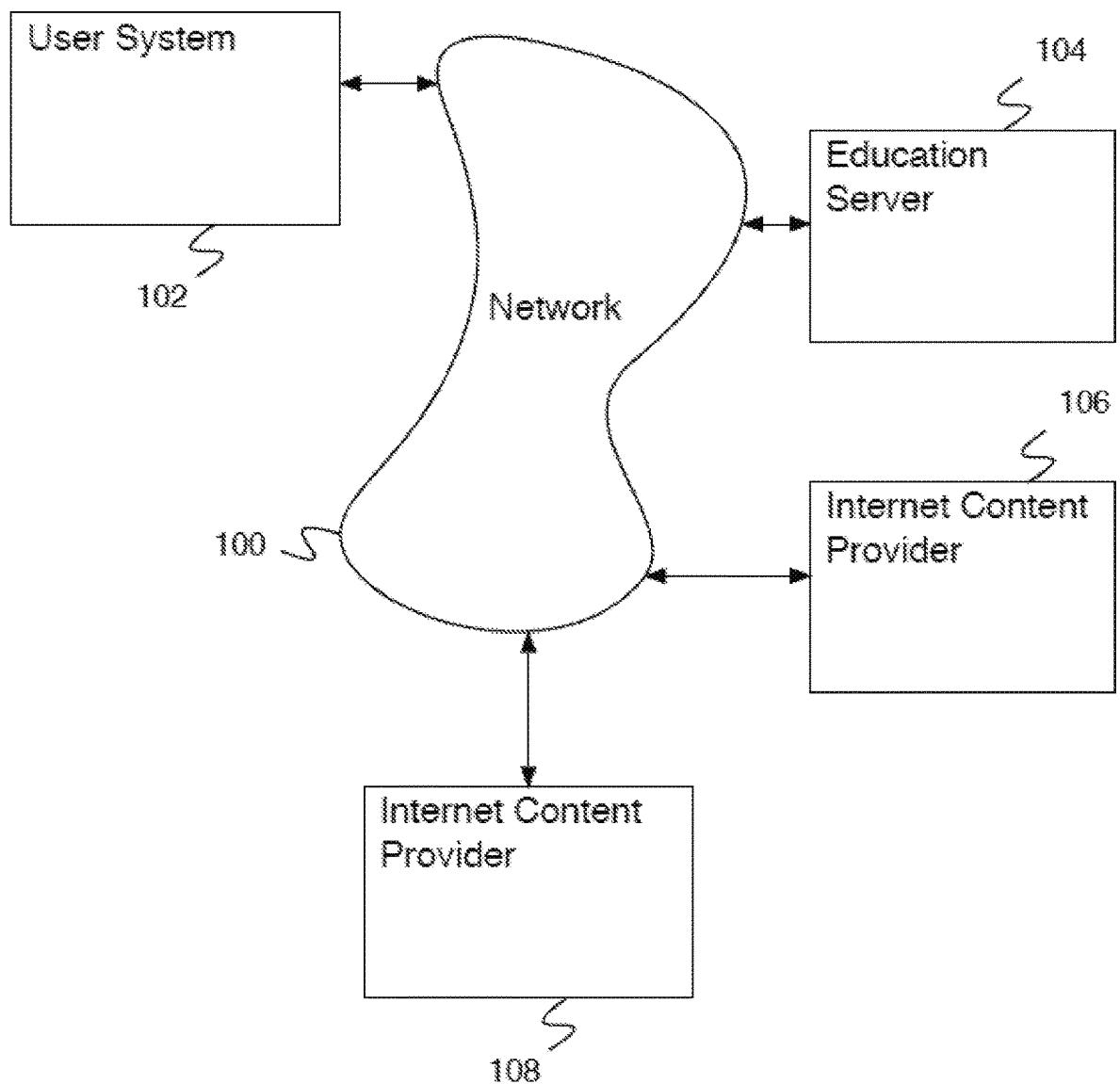
FIG. 1 is a block diagram illustrating an embodiment of a network system comprising an education server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An educational learning importation system is disclosed. The system comprises an input interface and a processor. The input interface is configured to receive a selection of educational information. The selection of educational information is made from a combined set of search results based at least in part on searching a real time source and a static source. The processor is configured to determine whether the educational information is allowed to be imported; in the event that the educational information is allowed to be imported, determine whether it is selected to import the educational information; in the event that the educational information is selected to import the educational information, import the educational information; and provide the educational information.

In some embodiments, a system for searching comprises an input interface to receive a request to search for educational information, and a processor to determine a set of Internet search results from one or more real-time sources, determine one or more static content sources, determine a combined set of search results based on the Internet search results and the one or more static content sources, and provide the combined set of search results.

In some embodiments, a system for searching comprises a system for determining a set of search results. In some embodiments, the system for determining a set of search results comprises static content sources. In some embodiments, static content sources comprise locally stored indexes of search results. In some embodiments, a locally stored index of search results is associated with a content provider. In some embodiments, a locally stored index of search results associated with a content provider comprises a list of all possible search results associated with the content provider (e.g., all content provided by the content provider). In some embodiments, determining a set of search results comprises determining a set of search results from a locally stored index of search results. In some embodiments, determining a set of search results comprises determining one or more static content sources (e.g., one or more static content sources of all known static content sources). In some embodiments, determining a set of search results comprises determining a set of search results from the one or more static content sources. In some embodiments, determining a set of search results comprises ranking a set of search results. In some embodiments, determining a set of search results comprises filtering a set of search results.

In some embodiments, a system for searching comprises a system for determining a set of Internet search results from one or more real-time sources. In some embodiments, the one or more real-time sources comprise Internet sources for hosting content. In some embodiments, the one or more Internet sources comprise sources storing a large number of search results (e.g., more results than can reasonably by indexed to create a static content source, results that are updated very frequently, etc.). In some embodiments, the one or more Internet sources comprise sources providing a searching function (e.g., an Internet source of the one or more Internet sources comprises the ability to receive a search query, determine a set of search results, and provide the search results to the querying system). In some embodiments, the system for searching provides a search query to one or more Internet sources and receives a set of Internet search results from each of the one or more Internet sources. In some embodiments, the system for searching determines a combined set of search results based at least in part on a set of real-time search results and one or more static content sources.

In some embodiments, determining a combined set of search results comprises determining a set of local search results from the one or more static content sources and determining a set of Internet search results from one or more real-time sources and combining the Internet search results and the set of local search results to determine the combined set of search results. The system for searching first performs a local search on the one or more static content sources to determine a set of local search results. The system additionally performs a search on the one or more real-time sources by providing a search query to the one or more real-time sources and receiving a set of Internet search results back from the one or more real-time sources. The system then combines the local search results and the Internet search results using a combining algorithm. In some embodiments, the combining algorithm comprises placing all results within a unified list and then sorting the unified list according to one or more sorting criteria.

In some embodiments, determining a combined set of search results comprises determining a set of Internet search results from one or more real-time sources and storing the Internet search results in a local cache (e.g., alongside the one or more static content sources). The system for searching then performs a local search on the locally stored sources of search results (e.g., including the one or more static content sources and the local cache of Internet search results) to determine a set of combined search results.

FIG. 1 is a block diagram illustrating an embodiment of a network system comprising an education server. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, education server 104, and one or more Internet content providers (e.g., Internet content provider 106 and Internet content provider 108) communicate via network 100. In some embodiments, user system 102 comprises a user system for use by a user. In various embodiments, user system 102 comprises a system for executing applications, processing data, displaying data, displaying images, displaying video, communicating with one or more server systems, or performing any other appropriate user system action. In some embodiments, user system 102 requests educational material from education server 104. In some embodiments, user system 102 requests education server 104 to perform a search for educational material. In some embodiments, the search for educational material comprises a search for educational material from one or more Internet content providers (e.g., Internet content provider 106 and Internet content provider 108). In some embodiments, education server 104 comprises a locally stored search index associated with an Internet content provider. In some embodiments, in response to a search query, education server 104 searches a locally stored search index to determine a set of local search results. In some embodiments, in response to a search query, education server 104 provides a search query to an Internet content provider to determine a set of Internet search results. In some embodiments, education server 104 combines a set of local search results and a set of Internet search results to determine a set of combined search results.

Figure 2:
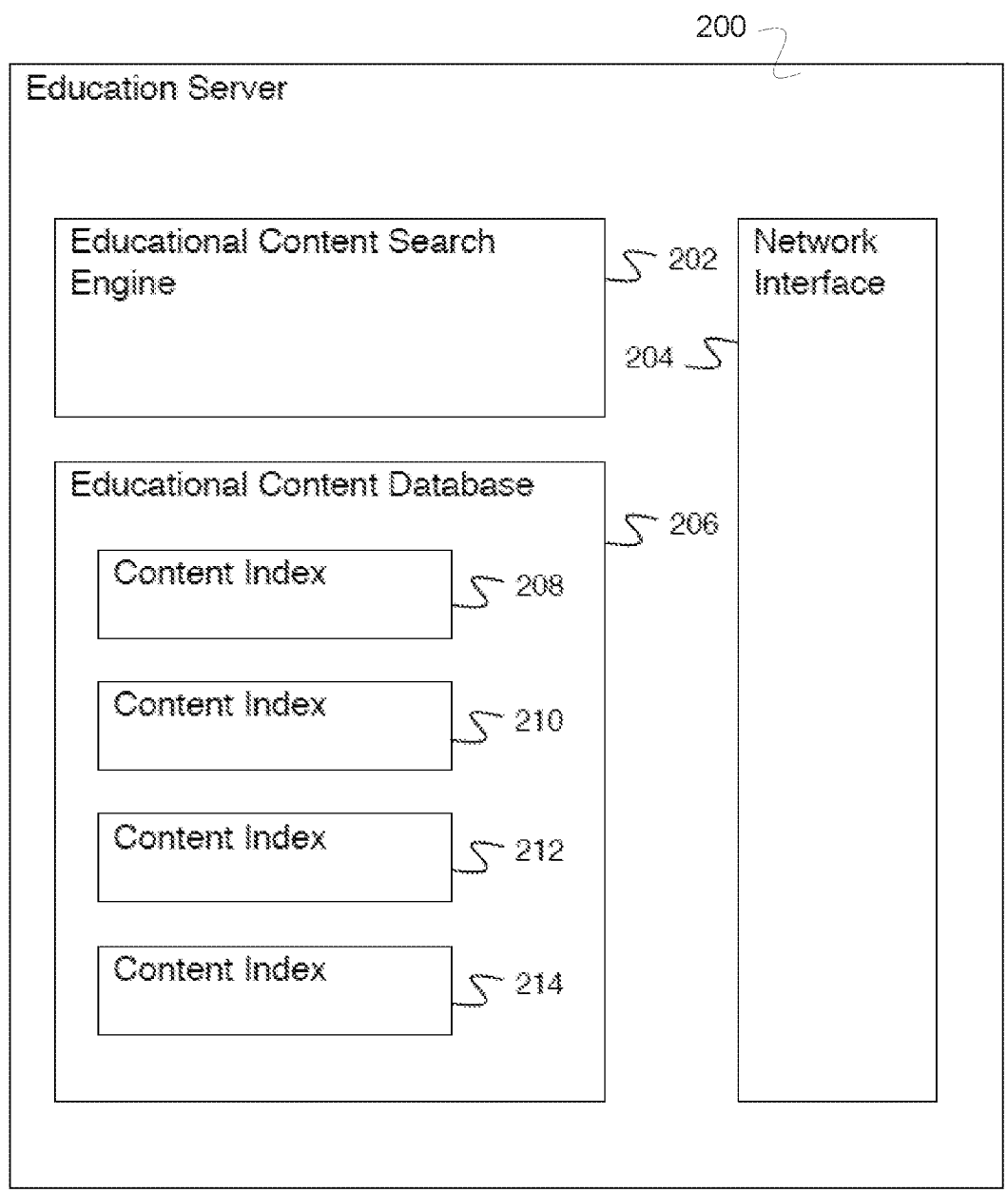
FIG. 2 is a block diagram illustrating an embodiment of an education server.

FIG. 2 is a block diagram illustrating an embodiment of an education server. In some embodiments, education server 200 comprises education server 104 of FIG. 1. In the example shown, education server 200 comprises educational content search engine 202. In various embodiments, educational content search engine 202 comprises a search engine for searching locally stored search results (e.g., search results stored in educational content database 206), for providing a search query to an Internet content provider via a network interface (e.g., network interface 204), for combining sets of search results, for locally storing search results (e.g., for storing search results received from an Internet content provider in educational content database 206), for storing a ranked list of search results, for providing a ranked list of search results, for filtering search results or for performing any other appropriate educational content search engine function. In some embodiments, educational content search engine 202 comprises a processor. Network interface 204 comprises an interface for communication via a network. In various embodiments, network interface 204 comprises a network interface for communicating with an Internet content provider (e.g., for providing a search query and receiving a set of search results, for providing a request for a search index and receiving the search index, etc.), for communicating with a user system, or for communicating with any other appropriate system. In some embodiments, network interface 204 is implemented using a processor. Educational content database 206 comprises a database for storing search results. In some embodiments, educational content database 206 comprises a database for locally storing a search index (e.g., a list of all content) associated with an Internet content provider. In some embodiments, educational content database 206 comprises a database for locally storing search results received from an Internet content provider. In the example shown, educational content database 206 comprises a set of content indexes (e.g., content index 208, content index 210, content index 212, and content index 214). In some embodiments, each content index of educational content database 206 is associated with an Internet content provider. In some embodiments, educational content database 206 is implemented using a processor. In various embodiments, the elements of education server 200 are implemented each on a separate processor, all on a single processor, or combined onto a plurality of processors in any other appropriate way. In some embodiments, education server additionally comprises a data storage.

FIG. 3 is a diagram illustrating an embodiment of search results. In some embodiments, the diagram of FIG. 3 illustrates an embodiment of search results for a search for education material on machine learning using an education server (e.g., education server 200 of FIG. 2). In the example shown, each result is received from a different source (e.g., a different Internet content provider). In the example shown, result 1 is received from YouTube®, result 2 is received from Udacity®, result 3 is received from Udemy®, and result 4 is received from Coursera®. Each of the 4 sources shown has different characteristics. The result received from YouTube comprises a result received via a search query provided to the Internet content provider (e.g., YouTube). The index of search results on YouTube is far too large for an education server to cache entirely, so a query is provided to YouTube and the returned results are processed. In some embodiments, the education server determines whether a result passes a threshold of quality based on a number of views, a number of likes, and a number of dislikes. The results received from Udacity, Udemy, and Coursera all comprise results determined from a local database (e.g., the sets of possible results from each content provider are stored in the local database). In the example shown, the result from Udacity comprises an unpaid content result (e.g., access to the result requires the user to pay, and a subscription is not already present), the result from Udemy comprises a paid content result (e.g., access to the result requires the user to pay, and a subscription is already present), and the result from Coursera comprises a free content result (e.g., access to the result does not require the user to pay). In the example shown, each result comprises an organization type relevance value (e.g., a value describing the relevance of the result to organizations of the type performing the search). Each result additionally comprises an engagement factor value (e.g., a value describing the typical user engagement with the result).

Figure 4:
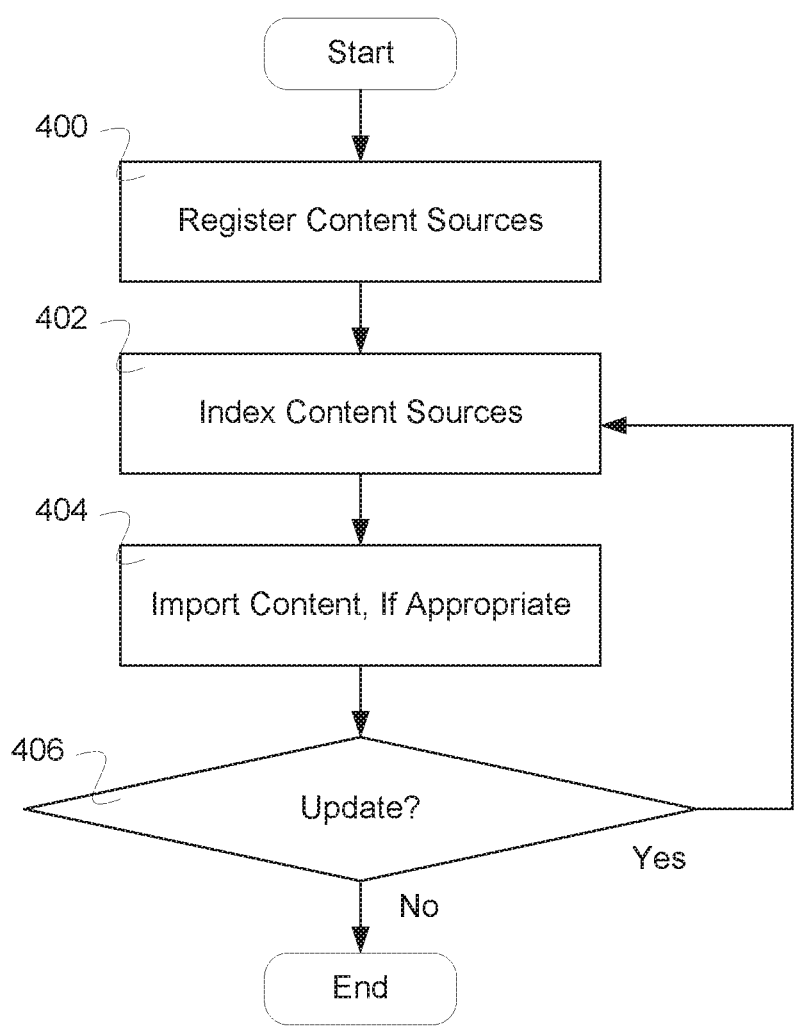
FIG. 4 is a flow diagram illustrating an embodiment of a process for a system for searching.

FIG. 4 is a flow diagram illustrating an embodiment of a process for a system for searching. In some embodiments, the process of FIG. 4 is implemented using educational server 300 of FIG. 3. In the example shown, in 400 content sources are registered. In some embodiments, a content source comprises an Internet content provider (e.g., Internet content provider 106 of FIG. 1 or Internet content provider 108 of FIG. 1). In some embodiments, a content source comprises a provider of educational content (e.g., videos, lesson plans, homework assignments, lecture notes, readings, etc.). In some embodiments, registering a content provider comprises configuring an education server to receive content from the content provider.

In some embodiments, an extensible architecture for a library can register content sources by providing flexibility for varied application programming interfaces (e.g., APIs), metadata models, and course packaging profiles. The library can index content of a vendor in the event that a piece of content meets a minimum set of requirements. The library may initiate and manage the inclusion of new content sources or may choose to open it to the public. The technology supports both models. The approach is outlined below and varies depending on the type of content source. The library will publish a standard library API. Vendors that meet the API's requirements can be registered directly in the system by adding their metadata with no programming changes. Vendors that do not meet the API requirements are accessible using an adapter. The library, the vendor, or a third party may develop the adapter.

In some embodiments, a first category of content providers is course content vendors that provides a catalog of learning assets, generally comprised of entire courses, that are available to be purchased by a customer. These vendors comprise static library content sources. Examples of static sources include Skillsoft®, Udemy, OpenSesame®, Coursera, and Edx®. In practice their learning catalogs are moderate in size and fairly static, changing perhaps on weekly basis as new courses are added and existing courses are updated or retired. Because of the moderate size of the collections, a rich text based search with meaningful relevance is generally not available and is not required by the library. On a scheduled basis the library indexer will index each content source into the library content index. The indexer will: execute the source's API; transform the returned course metadata to the library content metadata model; index new entries; and re-index (update) existing entries.

In some embodiments, a second category of sources is non-course content providers which manage vast libraries of content that may be included in a course as a lesson or used as a stand-alone lesson. These providers comprise real-time library content sources. Examples of real-time sources include YouTube, Vimeo®, and Slideshare®. This type of content is generally videos, powerpoints, and other document-based assets. These providers typically support a rich text based search with meaningful relevance. These repositories are not indexed by the library and instead are searched real time when a user searches for content using the library.

In some embodiments, the minimum API requirements for both static and real-time sources include:
Content Discovery API
  Static Library Content Sources—entire catalog
  Real-time Content Sources—text based search with meaningful relevance
Content Metadata
  unique ID
  course title
  description
  preview
  thumbnail
  launch\import link
  language
  supported devices (mobile, desktop)
  type (lesson, course)
  level
  duration
Support an acceptable authentication protocol such as Oauth
Authentication parameters needed to execute discovery API and import
  get course asset
  import or launch content
Tracking model that includes
  completion status
    Minimally supporting "Not Started", "In Progress" and "Complete"
    The API supports more granular events such as playtime, satisfaction, and other tracking data. Vendors that track more detail will provide better reporting data for their respective customers.
  pass/fail In some embodiments, registering a new content source comprises registering the source with the education server. In some embodiments, in the event the source API does not conform to the API requirements, registering the new content source additionally comprises implementing a connector.

In 402, content sources are indexed. For example, only static sources are indexed. In some embodiments, indexing static content sources comprises downloading an index of the contents of a static content source from the source. In some embodiments, indexing static content sources comprises re-indexing a static content source (e.g., updating an index of the contents of the static content source).

In 404, content is imported, if appropriate. For example, importing course meta-data for courses from static course sources. In various embodiments, content (e.g., course content) is imported based at least in part on one or more of the following: a size criteria (e.g., smaller than a maximum), a quality criteria (e.g., rating higher than a minimum rating, number of dislikes lower than a threshold, number of likes higher than a threshold, number of shares greater than a minimum, etc.), or any other appropriate criteria. In 406, it is determined whether to update. In the event it is determined to update, control passes to 402. In the event that it is determined not to update, the process ends.

In some embodiments, updating of content or content indexes is periodic (e.g., once a day, once a week, once a month, etc.). In some embodiments, the period of updates is based at least in part on the source (e.g., some sources update their catalog more frequently than others).

Figure 5:
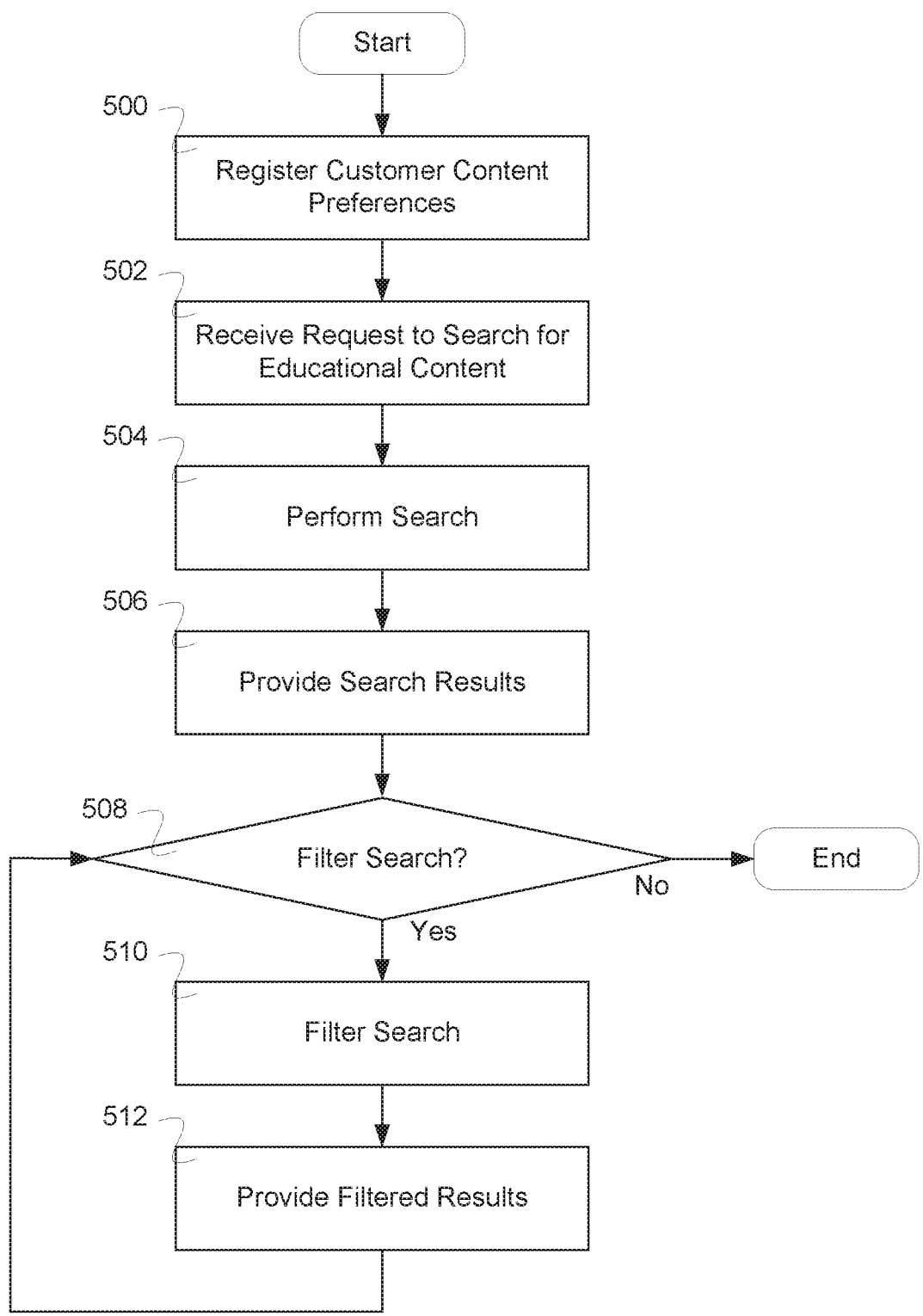
FIG. 5 is a flow diagram illustrating an embodiment of a process for a system for searching.

FIG. 5 is a flow diagram illustrating an embodiment of a process for a system for searching. In some embodiments, the process of FIG. 5 is implemented using educational server 200 of FIG. 2. In the example shown, in 500 customer content preferences are registered. In various embodiments, customer content preferences comprise content type preferences, content level preferences, content duration preferences, content language preferences, content locale preferences, or any other appropriate content preferences.

In some embodiments, the system for searching is designed to produce search results for each customer based on their preferences and who they are—for example, who they work for, what they do, where they prefer to learn, what language they speak, etc. The system for searching allows each customer to configure their preferences to optimize search relevance matching their unique situation and tastes. A set of customer content preferences is implemented by an extensible framework that can be extended over time. In some embodiments, customer content preferences comprise:

Valence/sentiment analysis from reviews, ratings, and other satisfaction data on imported lessons from the system for searching:
  Sourced from all customers that used the content
  Sourced only from customers like the user (e.g., same industry sector)
  Including vendor satisfaction data
Language compatibility
  With increased relevance for customer's preferred language
Mobile and device compatibility
  With increased relevance for IOS mobile offerings
  With increased relevance for Android mobile offerings
  With increased relevance for Desktop offerings
Customer's Content Provider quality ranking In some embodiments, registering search preferences comprises registering customer content preferences and persisting the preferences in a customer associated tenant storage.

In 502, a request to search for educational content is received. For example, a user requests a search for educational content. In some embodiments, the request to search for educational content comprises search terms. In some embodiments, the request to search for educational content comprises an indication of one or more desired content sources. In some embodiments, the request to search for educational content comprises updated customer content preferences. In 504, the search is performed. In 506, the search results are provided. For example, the results are provided to the user by the system for searching (e.g., an education server). In 508, it is determined whether to filter the search. In the event that it is determined not to filter the search, the process ends. In the event that it is determined to filter the search, in 510 a search is filtered. In various embodiments, the search results are filtered by result type (e.g., an entire course or a single lesson), by level (e.g., beginner, intermediate, or advanced), by duration (e.g., less than 10 minutes, less than 30 minutes, less than 60 minutes, 1-5 hours, 5 or more hours, 20 or more hours, etc.), and by language (e.g., English, Spanish, German, French, Italian, etc.). In some embodiments, the search results are filtered by more than one factor at once. In 512, filtered results are provided.

Figure 6A:
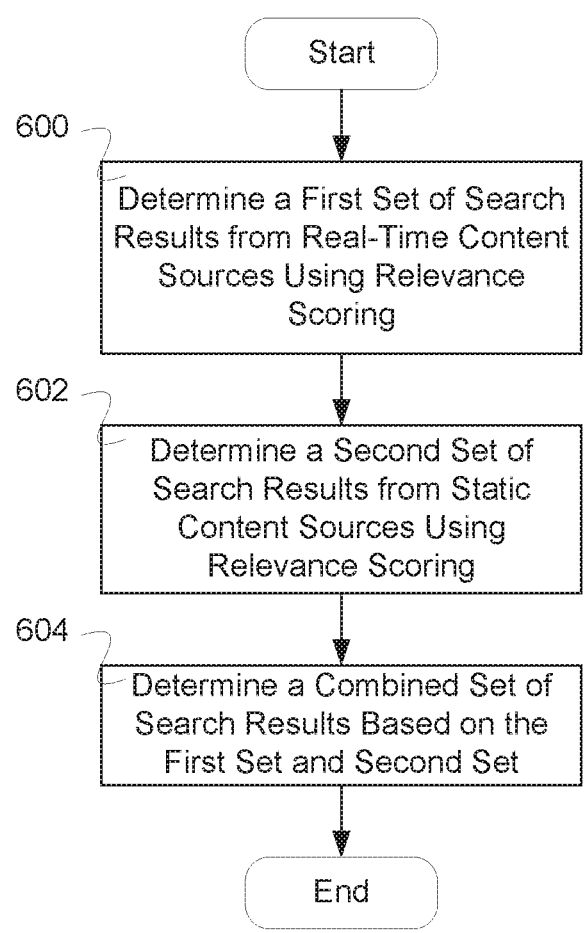
FIG. 6A is a flow diagram illustrating an embodiment of a process for performing a search.

FIG. 6A is a flow diagram illustrating an embodiment of a process for performing a search. In some embodiments, the process of FIG. 6A is used to implement 504 of FIG. 5. In the example shown, in 600 a first set of search results from real time content sources is determined using relevance scoring. In 602, a second set of search results from static content sources is determined using relevance scoring. In various embodiments, a relevance score is based at least in part on a vendor, on a course valence, on a language compatibility, on a locale compatibility, on a device compatibility, or on any other appropriate factor. In some embodiments, a relevance score comprises a normalized relevance score. In 604, a combined set of search results is determined based on the first set and the second set. In various embodiments, there are more sets of search results— for example, a set of search results is returned from more than one static source and/or more than one real-time source, or any other appropriate sources. In some embodiments, a set of search queries is provided to a plurality of sources and the list of results provided to the user is updated and ranked as the results are received.

In some embodiments, FIGS. 6B-6I comprise an example illustrating determining relevance normalization and personalization in a search of three sources: Udemy, YouTube, and Udacity.

FIG. 6B is table illustrating an embodiment of customer preferences. In some embodiments, the table of FIG. 6B is used in the determination of a relevance score of 602 of FIG. 6A. In the example, shown, table 610 shows factors for mobile support, language, source, utilization, and popularity/valence and their importance low, high, medium, high, and low, respectively. The score lift on a 100 point scale is as follows; for mobile support, +1 point; for language, +5 points; for source, +3 points for Udemy, +2 points for YouTube, and +1 point for Udacity; for utilization, +3 points for >100 internal views (e.g., views by customers associated with a client) and +2 points for >1000 external views (e.g., views by general public); and for popularity/valence, +1 point for >75% positive feedback.

FIGS. 6C, 6D, and 6E are tables illustrating embodiments of raw search results. In some embodiments, the tables of FIGS. 6C, 6D, and 6E are used in the determination of relevance scores of 600 and/or 602 of FIG. 6A. In the example shown in FIG. 6C, table 620 has 4 columns: source, result key, attributes, and raw relevance. Three example results are shown. In some embodiments, any number of results are returned. Source results are results from Udacity. A result key comprises a unique identifier that identifies a search result from a source. The search result returns attributes. For example, for result key 1, attributes are mobile—yes, language—English, utilization: 0 internal views, 589 external views, and popularity/valence—no data; for result key 2, attributes are mobile—yes, language—English, utilization: 110 internal views, 12,251 external news, and popularity/valence—no data; and for result key 3, attributes are mobile—no, language—German, utilization: 35 internal views, 589 external views, and popularity/valence—no data. The search result returns raw relevance (e.g., a score provided by the source's search engine related to the relevance of a search result to the query). For example, for result key 1 raw relevance is 0.76, for result key 2, raw relevance is 0.62, and for result key 3, raw relevance is 0.52.

In some embodiments, there are more than three results received from a source.

In the example shown in FIG. 6D, table 630 has 4 columns: source, result key, attributes, and raw relevance. Three example results are shown. In some embodiments, any number of results are returned. Source results are results from YouTube. A result key comprises a unique identifier that identifies a search result from a source. The search result returns attributes. For example, for result key 4, attributes are mobile—yes, language—English, utilization: 0 internal views, 100k external views, and popularity/valence—23 likes, 700 dislikes; for result key 5, attributes are mobile—yes, language—English, utilization: 1400 internal views, 32k external views, and popularity/valence—4567, 9 dislikes; and for result key 6, attributes are mobile—yes, language—English, utilization: 0 internal views, 4234 external views, and popularity/valence—321 likes, 0 dislikes. The search result returns raw relevance (e.g., a score provided by the source's search engine related to the relevance of a search result to the query). For example, for result key 4 raw relevance is 0.246, for result key 5, raw relevance is 0.345, and for result key 36, raw relevance is 0.689.

In the example shown in FIG. 6E, table 640 has 4 columns: source, result key, attributes, and raw relevance. Three example results are shown. In some embodiments, any number of results are returned. Source results are results from Udemy. A result key comprises a unique identifier that identifies a search result from a source. The search result returns attributes. For example, for result key 7, attributes are mobile—no, language—English, utilization: 432 internal views, 10,332 external views, and popularity/valence—3 out of 5 stars; for result key 8, attributes are mobile—no, language—English, utilization: 0 internal views, 4234 external views, and popularity/valence—4 out of 5 stars; and for result key 9, attributes are mobile—no, language—English, utilization: 98 internal views, 345 external views, and popularity/valence—5 out of 5 stars. The search result returns raw relevance (e.g., a score provided by the source's search engine related to the relevance of a search result to the query). For example, for result key 7 raw relevance is 1.24, for result key 8, raw relevance is 2.35, and for result key 9, raw relevance is 2.97.

Figure 6F:
FIG. 6F is a table illustrating an embodiment of a raw relevance and a normalized relevance.

FIG. 6F is a table illustrating an embodiment of a raw relevance and a normalized relevance. In some embodiments, table 650 of FIG. 6F is used in the determination of a relevance scores of 600 and 602 of FIG. 6A. In the example shown, table 650 shows a normalized relevance score and a raw relevance score. The normalized relevance score is calculated for a source by dividing a raw score from a maximum relevance score from that source times 100. Result key 1 for source Udacity has raw relevance 0.76 and normalized relevance 100. Result key 2 for source Udacity has raw relevance 0.62 and normalized relevance 72. Result key 3 for source Udacity has raw relevance 0.52 and normalized relevance 68. Result key 4 for source YouTube has raw relevance 0.246 and normalized relevance 36. Result key 5 for source YouTube has raw relevance 0.345 and normalized relevance 50. Result key 6 for source YouTube has raw relevance 0.689 and normalized relevance 100. Result key 7 for source Udemy has raw relevance 1.24 and normalized relevance 41. Result key 8 for source Udemy has raw relevance 2.35 and normalized relevance 79. Result key 9 for source Udemy has raw relevance 2.97 and normalized relevance 100.

Figure 6G:
FIG. 6G is a table illustrating an embodiment of a lifted relevance and a normalized relevance.

FIG. 6G is a table illustrating an embodiment of a lifted relevance and a normalized relevance. In some embodiments, table 660 of FIG. 6G is used in the determination of a relevance scores of 600 and 602 of FIG. 6A. In the example shown, table 660 shows a normalized relevance score and a lifted relevance score. The lifted relevance score is calculated for a source by adding a lift from personal preferences based on attributes returned from search results. In some embodiments, the lifted score is calculated using the Score Lift of 610 of FIG. 6B. Result key 1 for source Udacity has normalized relevance 100 and lifted relevance of 107 (e.g., with lift+1 from mobile, lift+5 from language, lift+1 from source, lift+0 from utilization, and lift+0 from popularity/valence). Result key 2 for source Udacity has normalized relevance 72 and lifted relevance of 85 (e.g., with lift+1 from mobile, lift+5 from language, lift+1 from source, lift+5 from utilization, and lift+1 from popularity/valence). Result key 3 for source Udacity has normalized relevance 68 and lifted relevance of 74 (e.g., with lift+0 from mobile, lift+5 from language, lift+1 from source, lift+0 from utilization, and lift+0 from popularity/valence). Result key 4 for source YouTube has normalized relevance 36 and lifted relevance of 47 (e.g., with lift+1 from mobile, lift+5 from language, lift+2 from source, lift+2 from utilization, and lift+1 from popularity/valence). Result key 5 for source YouTube has normalized relevance 50 and lifted relevance of 64 (e.g., with lift+1 from mobile, lift+5 from language, lift+2 from source, lift+5 from utilization, and lift+1 from popularity/valence). Result key 6 for source YouTube has normalized relevance 100 and lifted relevance of 111 (e.g., with lift+1 from mobile, lift+5 from language, lift+2 from source, lift+2 from utilization, and lift+1 from popularity/valence). Result key 7 for source Udemy has normalized relevance 41 and lifted relevance of 54 (e.g., with lift+0 from mobile, lift+5 from language, lift+3 from source, lift+5 from utilization, and lift+0 from popularity/valence). Result key 8 for source Udemy has normalized relevance 79 and lifted relevance of 90 (e.g., with lift+0 from mobile, lift+5 from language, lift+3 from source, lift+2 from utilization, and lift+1 from popularity/valence). Result key 9 for source Udemy has normalized relevance 100 and lifted relevance of 109 (e.g., with lift+0 from mobile, lift+5 from language, lift+3 from source, lift+0 from utilization, and lift+1 from popularity/valence).

Figure 6H:
FIG. 6H is a table illustrating an embodiment of personalized relevance and lifted relevance.

FIG. 6H is a table illustrating an embodiment of lifted relevance and personalized relevance. In some embodiments, table 670 of FIG. 6H is used in the determination of relevance scores 600 and 602 of FIG. 6A. In the example shown, table 670 shows a lifted relevance score and a personalized relevance score. The personalized relevance score is calculated by dividing a lifted relevance score by a maximum lifted relevance score times 100. Result key 1 for source Udacity has lifted relevance 107 and personalized relevance 96. Result key 2 for source Udacity has lifted relevance 85 and personalized relevance 77. Result key 3 for source Udacity has lifted relevance 74 and personalized relevance 62. Result key 4 for source YouTube has lifted relevance 47 and personalized relevance 42. Result key 5 for source YouTube has lifted relevance 64 and personalized relevance 57. Result key 6 for source YouTube has lifted relevance 111 and personalized relevance 100. Result key 7 for source Udemy has lifted relevance 54 and personalized relevance 49. Result key 8 for source Udemy has lifted relevance 90 and personalized relevance 81. Result key 9 for source Udemy has lifted relevance 109 and personalized relevance 98.

Figure 6I:
FIG. 6I is a table illustrating an embodiment of personalized relevance.

FIG. 6I is a table illustrating an embodiment of personalized relevance. In some embodiments, table 680 of FIG. 6I is used in the determination of relevance scores 600 and 602 of FIG. 6A. In the example shown, table 680 shows a table sorted by the personalized relevance score. Personalized relevance 100 listed first from source YouTube with result key 6. Personalized relevance 98 listed second from source Udemy with result key 9. Personalized relevance 96 listed third from source Udacity with result key 1. Personalized relevance 81 listed fourth from source Udemy with result key 8. Personalized relevance 77 listed fifth from source Udacity with result key 2. Personalized relevance 62 listed sixth from source Udacity with result key 3. Personalized relevance 57 listed seventh from source YouTube with result key 5. Personalized relevance 49 listed eighth from source Udemy with result key 7. Personalized relevance 42 listed ninth from source YouTube with result key 4.

In various embodiments, a list of search results is sorted according to one or more of: customer content preferences, a search request, a relevance score, an engagement score, or any other appropriate factor. In various embodiments, a relevance score is based on one or more of: a vendor, a course valence, a language compatibility, a locale compatibility, a device compatibility, or any other appropriate factor. In some embodiments, an engagement score is based at least in part on a previous user interaction with a search result.

Figure 7:
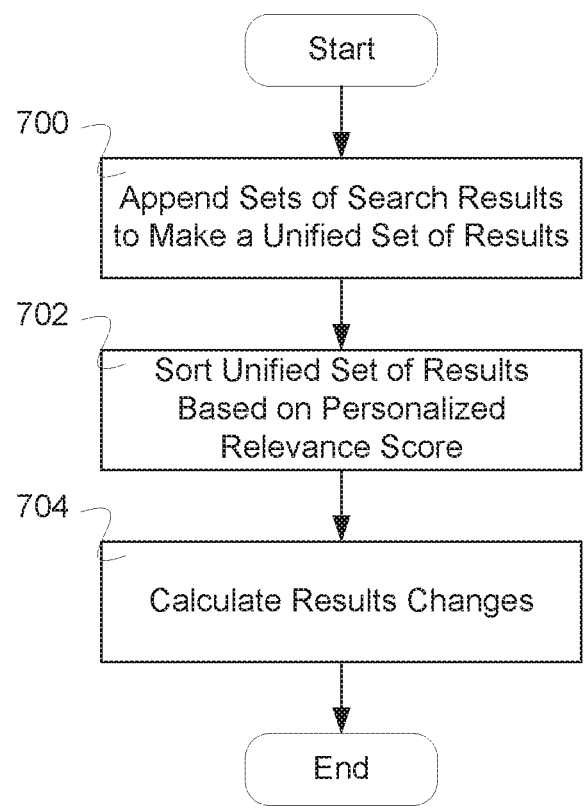
FIG. 7 is a flow diagram illustrating an embodiment of a process for determining a combined set of search results.

FIG. 7 is a flow diagram illustrating an embodiment of a process for determining a combined set of search results. In some embodiments, the process of FIG. 7 is used to implement 604 of FIG. 6A. In the example shown, in 700 sets of search results are appended to make a unified set of results. In 702, the unified set of results is sorted based on a personalized relevance score. In 704, results changes are calculated.

Figure 8:
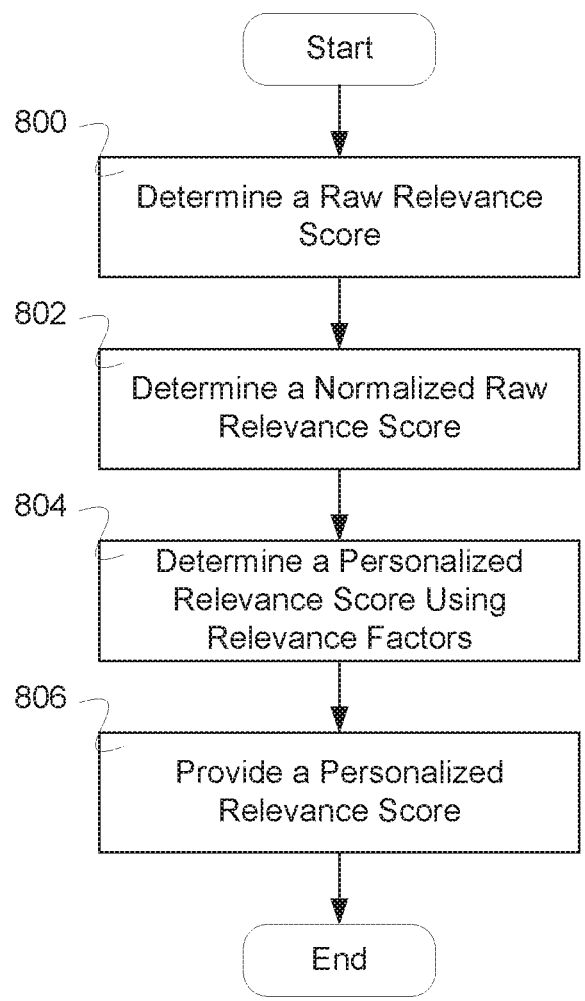
FIG. 8 is a flow diagram illustrating an embodiment of a process for determining a personalized relevance score.

FIG. 8 is a flow diagram illustrating an embodiment of a process for determining a personalized relevance score. In some embodiments, the process of FIG. 8 is used to sort a unified set of results in 702 of FIG. 7. In the example shown, in 800 a raw relevance score is determined. In 802, a normalized raw relevance score is determined. In 804, a personalized relevance score is determined using relevance factors. In 806, a personalized relevance score is provided. For example, a raw relevance score is received from a source, the raw relevance score is normalized by the maximum score for that source, the normalized score is adjusted by personal preferences (e.g., by looking at the attributes, source, etc. and adjusting the normalized score based on the values of the attributes, sources, etc.), the adjusted scores are normalized by the maximum adjusted score, and the search results are sorted by the normalized adjusted scores.

Figure 9:
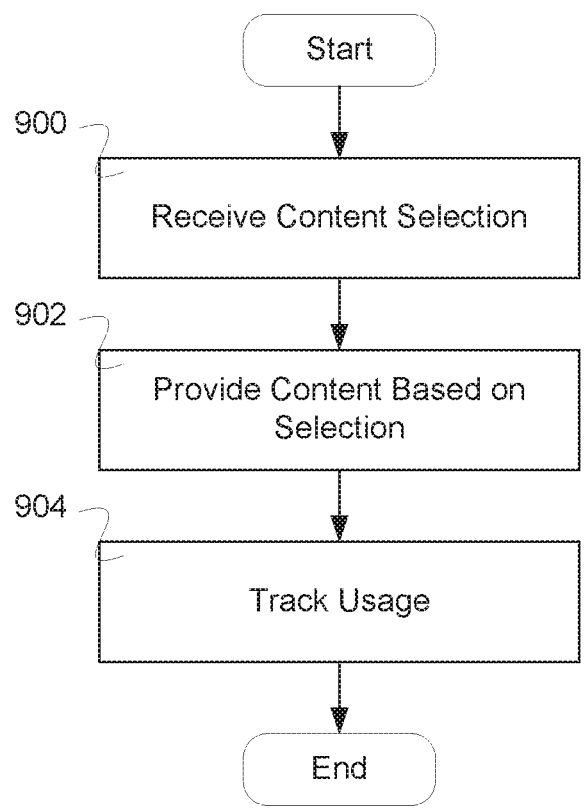
FIG. 9 is a flow diagram illustrating an embodiment of a process for tracking for a system for searching.

FIG. 9 is a flow diagram illustrating an embodiment of a process for tracking for a system for searching. In some embodiments, the process of FIG. 9 is implemented by educational server 200 of FIG. 2. In the example shown, in 900 a content selection is received. For example, a user selects a content (e.g., educational information from a list of search results) that a user desires to view. In 902, a content is provided based on the selection. For example, the user is provided with content to view based on the selection. In 904, usage is tracked. For example, the user's interaction with the content viewing is monitored (e.g., skipping while viewing, stopping while viewing, reviewing, pausing while viewing, etc.).

Figure 10:
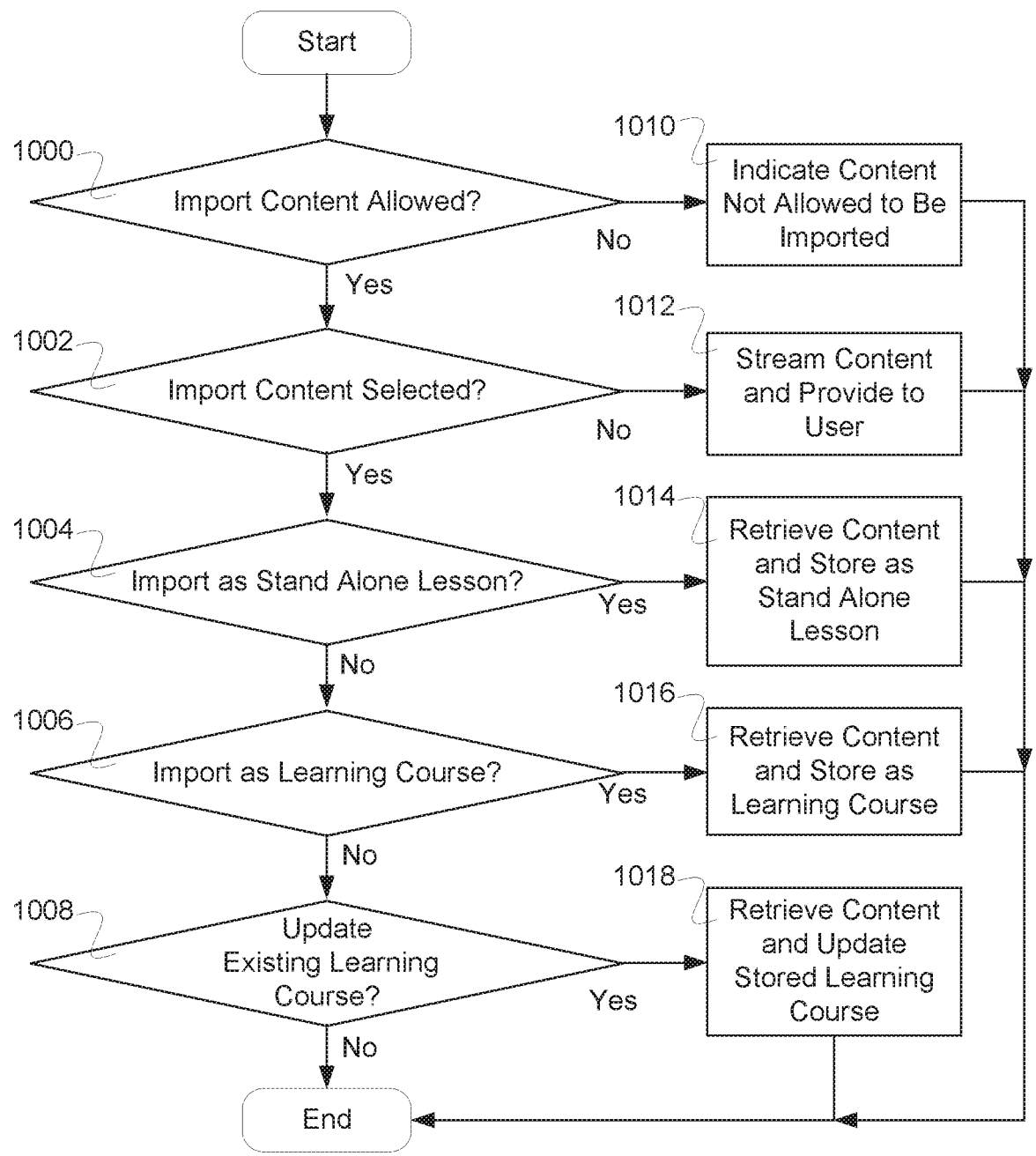
FIG. 10 is a flow diagram illustrating an embodiment of a process for importing content.

FIG. 10 is a flow diagram illustrating an embodiment of a process for importing content. In some embodiments, the process of FIG. 10 is used to implement 902 of FIG. 9, where the content is imported in order to provide the content to a user. In the example shown, 10 1000 it is determined whether importing content is allowed. In various embodiments, allowance of importing content is based on one or more of the following: user has not yet purchased the course, a size criteria (e.g., size less than a maximum size), a quality criteria (e.g., rating greater than minimum, likes greater than minimum, dislikes less than maximum, shares greater than minimum, etc.), a source criteria (e.g., on an approved source list, level greater than minimum level, etc.), or any other appropriate criteria. In the event that importing content is not allowed, then control passes to 1010. In 1010, it is indicated that content is not allowed to be imported. In some embodiments, a user is redirected to a source website to setup access (e.g., to setup an account or to purchase content). In the event that importing content is allowed, then in 1002, it is determined whether importing content is selected. In the event that importing content is not selected, control passes to 1012. In 1012, content is streamed and provided to the user. For example, based on a search result a location for retrieving the content is used to enable providing the requesting user the content. In the event that importing content is selected, in 1004 it is determined whether to import as a stand-alone lesson. In the event that it is determined to import as a stand-alone lesson, in 1014 the content is retrieved and stored as a stand-alone lesson. In the event that it is determined to not import as a stand-alone lesson, in 1006 it is determined whether to import as a learning course. In the event that it is determined to import as a learning course, in 1016 the content is retrieved and stored as a learning course. In the event that it is determined to not import as a learning course, in 1008 it is determined whether to import as an update to an existing learning course. In the event that it is determined to import as an update to a learning course, in 1018 the content is retrieved and a stored learning course is updated. In the event that it is determined to not import as an update to a learning course, then the process ends. Content may either be imported as raw media such as videos or the meta-data required (location) to launch and track the content from the content providers site.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for searching, comprising:
an input interface is configured to receive from a user a selection of educational information, wherein the selection of the educational information is made from a combined set of search results determined based at least in part on searching a real-time source and searching a static source, wherein searching the real-time source comprises submitting a search query to a first Internet source for hosting content and searching the static source comprises searching a locally stored search index associated with a second Internet source for hosting content;
a hardware processor; and
a memory coupled with the processor, wherein the memory is configured to provide the processor with instructions which when executed cause the processor to:
  determine whether a size of a collection associated with a new Internet source exceeds a threshold;
  in response to determining that the size of the collection associated with the new Internet source does not exceed the threshold, register the new Internet source as the static source, wherein registering the new Internet source as the static source comprises creating and storing the locally stored search index, wherein creating the locally stored search index comprises transforming metadata to generate new index entries, wherein the metadata includes a launch\import link;
  in response to determining that the size of the collection associated with the new Internet source exceeds the threshold, register the new Internet source as the real-time source;
  determine whether the educational information is allowed to be imported based at least in part on one or more of a purchase criteria, a size criteria, a quality criteria, and a source criteria;
  in response to determining that the educational information is allowed to be imported:
    determine whether it is selected to import the educational information;
    in response to determining that it is not selected to import the educational information, stream the educational information; and
    in response to determining that it is selected to import the educational information, import the educational information.

2. The system of claim 1, wherein the combined set of search results are based at least in part on a relevance score.

3. The system of claim 1, wherein the combined set of search results are based at least in part on a personalized relevance score.

4. The system of claim 1, wherein the processor is further configured to track usage.

5. The system of claim 4, wherein tracking usage comprises tracking engagement.

6. The system of claim 5, wherein tracking engagement comprises tracking user interaction during video playback.

7. The system of claim 6, wherein user interaction comprises one or more of the following: skipping ahead, skipping back, pausing, and stopping.

8. The system of claim 6, wherein user interaction comprises interacting with an application.

9. The system of claim 1, wherein the combined set of search results is based at least in part on one or more of the following: a number of likes, a number dislikes, a number of views, and a number of shares.

10. A method for searching, comprising:
  receiving from a user a selection of educational information, wherein the selection of the educational information is made from a combined set of search results determined based at least in part on searching a real-time source and searching a static source, wherein searching the real-time source comprises submitting a search query to a first Internet source for hosting content and searching the static source comprises searching a locally stored search index associated with a second Internet source for hosting content;
  determining whether a size of a collection associated with a new Internet source exceeds a threshold;
  in response to determining that the size of the collection associated with the new Internet source does not exceed the threshold, registering the new Internet source as the static source, wherein registering the new Internet source as the static source comprises creating and storing the locally stored search index, wherein creating the locally stored search index comprises transforming metadata to generate new index entries, wherein the metadata includes a launch\import link;
  in response to determining that the size of the collection associated with the new Internet source exceeds the threshold, registering the new Internet source as the real-time source;
  determining whether the educational information is allowed to be imported based at least in part on one or more of a purchase criteria, a size criteria, a quality criteria, and a source criteria;
  in response to determining that the educational information is allowed to be imported:
    determining whether it is selected to import the educational information;
    in response to determining that it is not selected to import the educational information, streaming the educational information; and
    in response to determining that it is selected to import the educational information, importing the educational information.

11. A computer program product for searching, the computer program product being embodied in a non-transitory computer readable storage medium and comprising computer instructions for:
  receiving from a user a selection of educational information, wherein the selection of the educational information is made from a combined set of search results determined based at least in part on searching a real-time source and searching a static source, wherein searching the real-time source comprises submitting a search query to a first Internet source for hosting content and searching the static source comprises searching a locally stored search index associated with a second Internet source for hosting content;
  determining whether a size of a collection associated with a new Internet source exceeds a threshold;
  in response to determining that the size of the collection associated with the new Internet source does not exceed the threshold, registering the new Internet source as the static source, wherein registering the new Internet source as the static source comprises creating and storing the locally stored search index, wherein creating the locally stored search index comprises transforming metadata to generate new index entries, wherein the metadata includes a launch\import link;
  in response to determining that the size of the collection associated with the new Internet source exceeds the threshold, registering the new Internet source as the real-time source;
  determining whether the educational information is allowed to be imported based at least in part on one or more of a purchase criteria, a size criteria, a quality criteria, and a source criteria;
  in response to determining that the educational information is allowed to be imported:

determining whether it is selected to import the educational information;

in response to determining that it is not selected to import the educational information, streaming the educational information; and in response to determining that it is selected to import the educational information, importing the educational information.

12. The system of claim 1, further comprising educational information metadata, wherein the educational information metadata comprises the launch\ import link for streaming or importing the educational information.

13. The system of claim 1, wherein the processor is further configured to in response to determining that the educational information is not allowed to be imported, redirect the user to a source website to setup access.

14. The system of claim 1, wherein creating the locally stored search index comprises transforming course metadata received from the static source.

15. The system of claim 1, wherein creating the locally stored search index comprises executing an application programming interface (API) of the static source.

16. The system of claim 1, wherein searching the real-time source comprises executing an application programming interface (API) of the real-time source.

17. The system of claim 1, wherein registering the new Internet source as the static source comprises confirming an application programming interface (API) of the new Internet source meets application programming interface requirements.

18. The system of claim 1, wherein registering the new Internet source as the real-time source comprises confirming an application programming interface (API) of the new Internet source meets application programming interface requirements.

19. The system of claim 1, wherein registering the new Internet source as the static source comprises confirming an application programming interface (API) of the new Internet source does not meet application programming interface requirements, wherein the API is accessible using an adapter.

20. The system of claim 1, wherein registering the new Internet source as the real-time source comprises confirming an application programming interface (API) associated with the new Internet source does not meets application programming interface requirements, wherein the API is accessible using an adapter.

21. The system of claim 1, wherein importing the educational information comprises to:

determine whether to import the educational information as a stand-alone lesson and, in response to determining to import the educational information as the stand-alone lesson, retrieve the educational information and store the educational information as the stand-alone lesson;

determine whether to import the educational information as a learning course and, in response to determining to import the educational information as the learning course, retrieve the educational information and store the educational information as the learning course; and determine whether to import the educational information as an updated learning course and, in response to determining to import educational information as the updated learning course, retrieve the educational information and update the stored learning course using the educational information to obtain the updated learning course, wherein the updated learning course is stored.

* * * * *